United States Patent
Dosh et al.

[11] Patent Number: 5,886,665
[45] Date of Patent: Mar. 23, 1999

[54] GNSS LOCAL CONSTELLATION/ ACQUISITION AIDING SYSTEM

[75] Inventors: Mervin K. Dosh, Marion; Stephen G. Carlson, Anamosa, both of Iowa

[73] Assignee: Rockwell International, Costa Mesa, Calif.

[21] Appl. No.: 908,399

[22] Filed: Aug. 7, 1997

[51] Int. Cl.$^6$ ............................. G01S 5/02; H04B 7/185
[52] U.S. Cl. ............................. 342/357; 701/213
[58] Field of Search ........................ 342/357, 352; 701/213; 455/12.1

[56] References Cited

U.S. PATENT DOCUMENTS

| | | | |
|---|---|---|---|
| 5,434,789 | 7/1995 | Fraker et al. | 364/460 |
| 5,552,772 | 9/1996 | Janky et al. | 340/573 |
| 5,574,648 | 11/1996 | Pulley | 364/439 |
| 5,577,122 | 11/1996 | Schipper et al. | 380/28 |
| 5,594,425 | 1/1997 | Ladner et al. | 340/825.06 |
| 5,594,740 | 1/1997 | Ladue | 379/59 |
| 5,600,706 | 2/1997 | Dunn et al. | 379/59 |
| 5,699,255 | 12/1997 | Ellis et al. | 364/449.6 |

*Primary Examiner*—Thomas Tarcza
*Assistant Examiner*—Dao L. Pham
*Attorney, Agent, or Firm*—Kyle Eppele; James P. O'Shaughnessy

[57] ABSTRACT

An apparatus and method are disclosed of providing position indicating signals to a GNSS receiver in an area of poor reception of satellite signals from the GNSS or when a dedicated system under local control is required. The method includes the steps of disposing a plurality of stationary transceivers proximate the area of poor reception and calculating a global position of each stationary transceiver based upon information contained within signals received from at least some satellites of the GNSS. The method further includes the steps of transmitting a local global positioning signal from each of the stationary transceivers to the GNSS receiver in the area of poor reception, such local global positioning signals including at least the global position of the transmitting stationary transceiver.

25 Claims, 5 Drawing Sheets

12, 14, 16, 18

GNSS LOCAL CONSTELLATION/ ACQUISITION AIDING SYSTEM

FIELD OF THE INVENTION

The field of the invention relates to global navigational satellite systems and more particularly to signal transmitting devices for the global positioning system.

BACKGROUND OF THE INVENTION

Global position systems, such as the American NAVSTAR GPS and Russian GLONASS, are known. The NAVSTAR GPS developed by the U.S. Defense Department is a satellite-based radio navigation system which transmits information from which extremely accurate navigational calculations can be made in three-dimensional space anywhere on or near the Earth. Three-dimensional velocity can be determined with equal precision. The GPS uses 18 satellites evenly dispersed in three, inclined, 12 hour circular orbits chosen to ensure continuous 24 hour coverage worldwide. Each satellite uses extremely accurate cesium and rubidium vapor atomic clocks for generating a time base. Each satellite is provided with clock correction and orbit information by Earth-based monitoring stations.

Each satellite transmits a pair of L-band signals. The pair of signals includes an L1 signal at a frequency of 1575.42 MHZ and an L2 signal at a frequency of 1227.6 MHZ. The L1 and L2 signals are bi-phase modulated by pseudo-random noise (PRN) codes and an information signal (i.e., navigation data) encoded at 50 Hz. The PRN codes facilitate multiple access through the use of a different PRN code by each satellite.

Upon detecting and synchronizing with a PRN code, a receiver decodes the PRN encoded signal to recover the navigation data, including ephemeris data. The ephemeris data is used in conjunction with a set of Keplerian equations to precisely determine the location of each satellite. The receiver measures a phase difference (i.e., time of arrival) of signals from at least four satellites. The time differences are then used to solve a matrix of four equations. The result is a precise determination of location of the receiver in three-dimensional space.

Velocity of the receiver may be determined by a precise measurement of the L1 and L2 frequencies. The measured frequencies are used to determine Doppler frequency shifts caused by differences in velocity. The measured differences are used to solve another set of equations to determine velocity based upon the Doppler phase shift of the received signal.

A Russian GLONASS system operates in a similar manner except that each satellite transmits on a unique set of frequencies instead of a unique set of PRN codes.

While the GPS performs relatively well, there are still situations where receivers cannot detect satellite signals. For instance, where a receiver is located in a deep valley, a receiver cannot detect a sufficient number of satellite signals to accurately determine position. Accordingly, a need exists for a means of providing more powerful signals to receivers in suboptimum environments.

SUMMARY

Illustrative embodiments of apparatus and method are disclosed of providing position indicating signals to a GPS receiver in an area of poor reception of satellite signals from the GNSS or when a dedicated system under local control is required. The method includes the steps of disposing a plurality of stationary transceivers proximate the area of poor reception and calculating a global position of each stationary transceiver based upon information contained within signals received from at least some satellites of the GNSS. The method further includes the steps of transmitting a local global positioning signal from each of the stationary transceivers to the GNSS receiver in the area of poor reception, such local global positioning signals including at least the global position of the transmitting stationary transceiver.

DETAILED DESCRIPTION OF THE INVENTION

Figure 1:
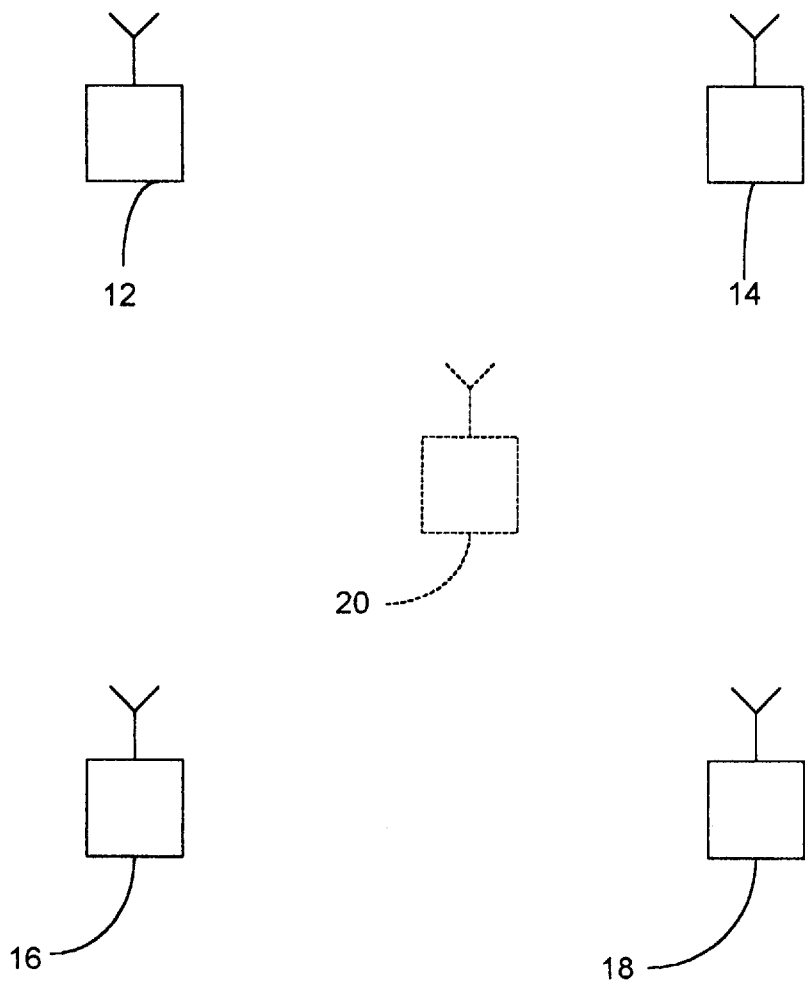
FIG. 1 is a block diagram of a constellation of pseudo-satellites and a receiver in accordance with an embodiment of the invention.

FIG. 1 is a block diagram of an illustrative embodiment of a system 10 for improving the performance of a GPS system in situations where satellite signals cannot be reliably detected. The system 10 may also be useful for operation as a private system or when a dedicated system under local control is required. While an embodiment of the invention will be described in terms of the NAVSTAR GPS, it is to be understood that the invention is applicable to any global navigation satellite system (GNSS), such as GPS or GLONASS.

Under the embodiment, a number of pseudo-satellites 12, 14, 16, 18 are disposed on the ground in or around an area of impaired reception and function as an acquisition aid for a local receiver 20. The pseudo-satellites 12, 14, 16, 18 may be placed in service in a selected location by parachute, by ground vehicle, or even by firing as an artillery shell. In one alternative embodiment, the pseudo-satellite would be of a rugged construction having a lance at an impact end which would become embedded in the ground upon impact and which would hold the pseudo-satellite in an upright operating position.

A pseudo-satellite (FIG. 2) 12, 14, 16, 18 fabricated in accordance with an embodiment of the invention would typically include at least two discrete sections. One section 22 would function as a GPS receiver and would operate to determine a location of the pseudo-satellite 12, 14, 16, 18. A second section 24 would function as a GPS transmitter and would operate to provide navigational information to local GPS receivers 20.

Figure 2:
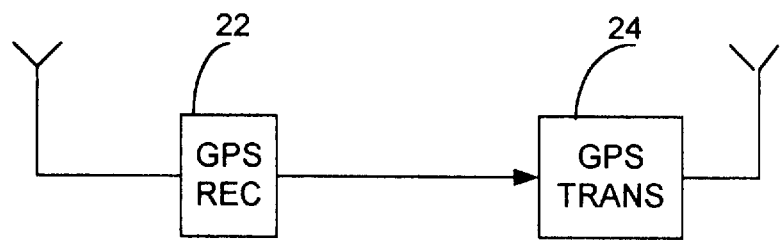
FIG. 2 is a block diagram of an illustrative embodiment of a pseudo-satellite of FIG. 1.

In operation, a pseudo-satellite (e.g., 12) in the illustrated embodiment of FIG. 2 determines its own location as under the prior art. It scans for and detects L1 and L2 signals from a first of at least four satellites (not shown) and acquires synchronization. Once synchronized, the pseudo-satellite 12 begins decoding the 50 Hz navigational data superimposed on the L1 and L2 signals.

Contained within the navigational data is the ephemeris data for the first satellite and almanac data for all the other satellites. From the six Keplerian orbit parameter terms of the ephemeris data, the pseudo-satellite 12 determines the position of the first satellite.

Using the almanac data also received, the pseudo-satellite 12 next locates the general orbit and orbit positions of at least three more satellites. Upon locating the satellites, the pseudo-satellite 12 synchronizes with those satellites and begins decoding the 50 Hz navigational data from each of those satellites. Using the ephemeris data, the pseudo-satellite is able to solve for the position of each of the three new satellites.

Upon determining the position of at least four satellites, the pseudo-satellite begins measuring the time delays (phase offsets) of the signals received from the four satellites against an internal clock. Upon knowing the position of at least four satellites and phase offset, the pseudo-satellite 12 may form its navigation and time solution. The pseudo-satellite 12 may do this by using a Kalman filter or by solving four equations with four unknowns.

Where four equations are used, each equation would include the three dimensional variables x, y, z and the fourth variable of time. The intersection of the four equations represents the position of the pseudo-satellite 12. By solving the matrix of equations, the pseudo-satellite 12 precisely determines its position in three-dimensional space.

Once each pseudo-satellite 12, 14, 16, 18 in the illustrated embodiment of FIG. 1 determines its position, it begins transmitting a pseudo-signal for the benefit of any GPS receiver 20 in the region. Since the pseudo-satellite 12, 14, 16, 18 would preferably be located at the edge of the region of impaired reception (e.g., near the summit of a surrounding mountain), it would be able to detect satellites much better than a conventional GPS receiver 20. Also since the pseudo-satellite 12, 14, 16, 18 may be ground based and may not be expected to have a long-term operational capability, it could be battery powered.

The pseudo-signal transmitted by the pseudo-satellite 12, 14, 16, 18 and received by the GPS receiver 20 may be processed under any of a number of different formats. For example, the pseudo-satellites (e.g., 12) may use identifiers of de-commissioned satellites and substantially duplicate the transmission of the satellite. One difference, however, is that the 50 Hz navigational data must be adapted to reflect the fact that the pseudo-satellite 12 is stationary. Dummy values may be used for the six Keplerian orbit parameter terms, with values chosen to produce a result in three-dimensional space consistent with the actual location and velocity of the pseudo-satellite 12.

Figure 3:
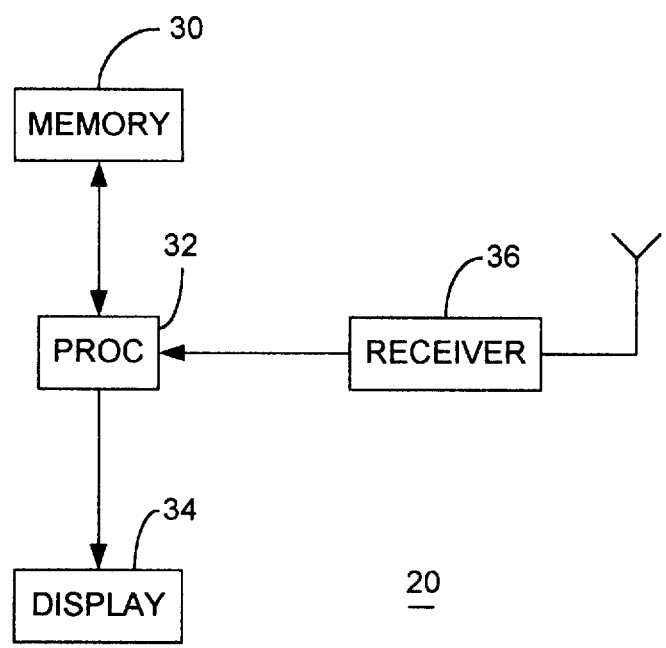
FIG. 3 is a block diagram of an illustrative embodiment of the GPS receiver of FIG. 1.

In another embodiment of the invention, the receiver 20 may be programmed to recognize transmissions from pseudo-satellites and alter its processing format accordingly. For example, the GPS receiver 20 (FIG. 3) may be programmed with a block of satellite ID numbers reserved for use with pseudo-satellites. The receiver 20 recognizes a transmission from a pseudo-satellite 12, 14, 16, 18 by comparing an ID received as a part of the navigational data with the block of ID numbers stored in memory 30.

Figure 4:
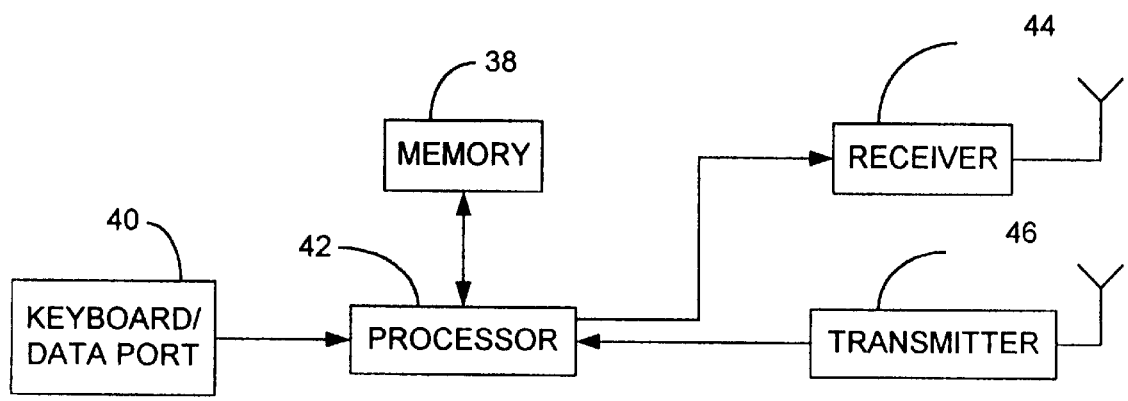
FIG. 4 is a more detailed block diagram of an illustrative embodiment of the pseudo-satellite of FIG. 2.

Since each pseudo-satellite 12, 14, 16, 18 (FIG. 4) has already calculated its location, the pseudo-satellite 12, 14, 16, 18 may transmit such information as part of the navigational data in place of the Keplerian orbit parameter terms. By forwarding its position to the receiver 20, the pseudo-satellite reduces the processing burden on the receiver 20 and improves the performance of the receiver 20.

Figure 5:
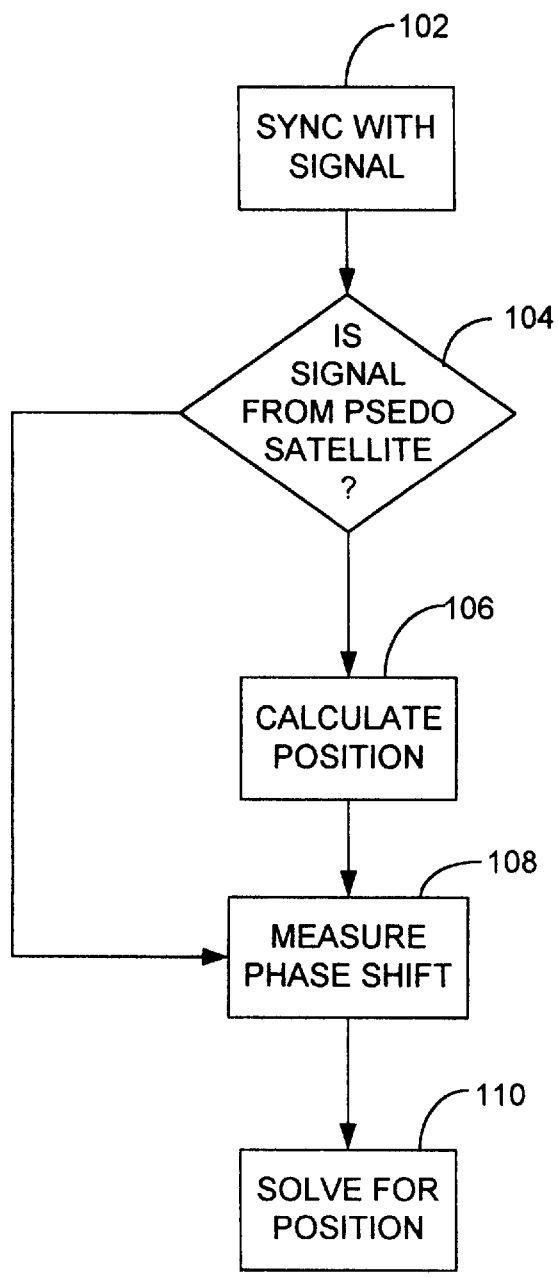
FIG. 5 is a flow chart showing an illustrative embodiment of the operational steps of the receiver of FIG. 1.

FIG. 5 is a flow chart of an illustrative example of the processing steps used by the receiver 20. As shown, once the receiver 20 synchronizes with the signal 102, the receiver 20 does a comparison to determine whether the signal is from a pseudo-satellite 12, 14, 16, 18. If the receiver 20 determines that the signal source is a pseudo-satellite, the receiver simply stores the navigational data as positional data and moves to the next step in determining position.

As a next step, the receiver 20 measures 108 a phase shift of the received signal. With the measured phase shift, the receiver solves for position.

In another embodiment of the invention, the receiver 20 recognizes signals from pseudo-satellites 12, 14, 16, 18 by comparing navigational data with threshold values. For example, the Keplerian orbit parameter of the square root of the semi major axis would never be a negative number. Intentionally sending a negative number would indicate to the receiver 20 that the signal source is a pseudo-satellite. Notifying the receiver that the source is a pseudo-satellite would then allow the receiver 20 to consider other terms as three-dimensional positional information instead of orbit parameter terms.

In another embodiment of the invention (FIG. 4), each pseudo-satellite 12, 14, 16, 18 is manually set-up for operation at an operating site by a technician (not shown) who manually enters position into the pseudo-satellite through a keyboard 40. The technician may determine position through a separate GPS receiver which the technician carries with him specifically for setting up pseudo-satellites. Alternatively, the GPS receiver carried by the technician and the pseudo-satellite may be equipped with a data port through which position may be automatically loaded into the pseudo-satellite upon start-up.

Once set-up for operation, the pseudo-satellite still receives and synchronizes with the L1, L2 signals from orbiting satellites. Such synchronization is required so that time delays measured by a GPS receiver 20 remain accurate.

Allowing for the one-time entry of position through the keyboard or data port 40 allows for a considerable simplification of the pseudo-satellite. For example, since the pseudo-satellite does not move, there is no need to decode navigational data or calculate satellite (or its own) position. As a consequence, the processor 42 may be of a lower speed than what otherwise may have been required. Further, since there is no need for storing navigational data or the complex programs needed for executing the Keplerian equations or the programs otherwise necessary for the location and time solution, the memory 38 may be considerably smaller.

When a single pseudo-satellite is deployed it can be used by a GNSS receiver to improve clock error resolution due to the inability to acquire live satellites. By acquiring and tracking the signal from a single pseudo-satellite the receiver can resolve time error due to the ambiguity of signal path length. When the receiver subsequently receives signals from live satellites or pseudo-satellites the acquisition is accomplished more quickly.

Specific embodiments of a method and apparatus for improving the performance of a GPS receiver according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

We claim:

1. A method of providing position indicating signals to a GNSS receiver in an area of poor reception of satellite signals from the GNSS or when a dedicated system under local control is required, such method comprising the steps of:

disposing a plurality of stationary transceivers proximate the area of poor reception; and transmitting a local global positioning signal from each of the stationary transceivers to the GNSS receiver in the area of poor reception, such local global positioning signals including at least a global position of the transmitting stationary transceiver.

2. The method of providing position indicating signals as in claim 1 further comprising calculating a global position of each stationary transceiver based upon information contained within signals received from at least some satellites of the GNSS.

3. The method of providing position indicating signals as in claim 1 further comprising including an identifier of each stationary transceiver in the local positioning signal.

4. The method of providing position indicating signals as in claim 1 further comprising synchronizing a reference clock of each stationary transceiver with a GNSS reference clock based upon a detected time of arrival of the signals received from the at least some satellites of the GNSS.

5. The method of providing position indicating signals as in claim 4 further comprising receiving almanac data from the at least some satellites of the plurality of satellites of the GNSS.

6. The method of providing position indicating signals as in claim 5 further comprising receiving ephemeris data from at least some satellites of the plurality of satellites of the GNSS.

7. The method of providing position indicating signals as in claim 6 wherein the step of calculating a global position of each stationary transceiver based upon information from a plurality of satellites of the GNSS further comprises determining a position of each of the at least some satellites using the received ephemeris data and a set of Kepler equations.

8. The method of providing a position indicating signal as in claim 7 wherein the step of calculating a global position of each stationary transceiver based upon information from a plurality of satellites of the GNSS further comprises determining a distance from each stationary transceiver and at least some satellites based upon a measured time difference between the GNSS reference clock and signals arriving from each of the at least some satellites of the GNSS.

9. The method of providing a position indicating signal as in claim 8 wherein the step of calculating a global position of each stationary transceiver based upon information from a plurality of satellites of the GNSS further comprises triangulating the position of each stationary transceiver based upon the position of each of at least some satellites and the measured distance of the satellite from each of the stationary transceivers.

10. Apparatus for providing position indicating signals to a GNSS receiver in an area of poor reception of satellite signals from the GNSS, such apparatus comprising:

a plurality of stationary transceivers proximate the area of poor reception;

means for calculating a global position of each stationary transceiver based upon information contained within signals received from at least some satellites of the GNSS; and means for transmitting a local global positioning signal from each of the stationary transceivers to the GNSS receiver in the area of poor reception, such local global positioning signals including at least the global position of the transmitting stationary transceiver.

11. The apparatus for providing position indicating signals as in claim 10 further comprising means for including an identifier of each stationary transceiver in the local positioning signal.

12. The apparatus for providing position indicating signals as in claim 10 further comprising means for synchronizing a reference clock of each stationary transceiver with a GNSS reference clock based upon a detected time of arrival of the signals received from the at least some satellites of the GNSS.

13. The apparatus for providing position indicating signals as in claim 12 further comprising means for receiving almanac data from the at least some satellites of the plurality of satellites of the GNSS.

14. The apparatus for providing position indicating signals as in claim 13 further comprising means for receiving ephemeris data from the at least some satellites of the plurality of satellites of the GNSS.

15. The apparatus for providing position indicating signals as in claim 14 wherein the means for calculating a global position of each stationary transceiver based upon information from a plurality of satellites of the GNSS further comprises means for determining a position of each of the at least some satellites using the received ephemeris data and a set of Kepler equations.

16. The apparatus for providing a position indicating signal as in claim 15 wherein the means for calculating a global position of each stationary transceiver based upon information from a plurality of satellites of the GNSS further comprises means for determining a distance from each stationary transceiver and the at least some satellites based upon a measured time difference between the GNSS reference clock and signals arriving from each of the at least some satellites of the GNSS.

17. The apparatus for providing a position indicating signal as in claim 16 wherein the means for calculating a global position of each stationary transceiver based upon information from a plurality of satellites of the GNSS further comprises means for triangulating the position of each stationary transceiver based upon the position of each of the at least some satellites and the measured distance of the satellite from each of the stationary transceivers.

18. Apparatus for providing position indicating signals to a GNSS receiver in an area of poor reception of satellite signals from the GNSS, such apparatus comprising:

a plurality of stationary transceivers proximate the area of poor reception;

a GNSS position processor within each stationary transceiver of the plurality of stationary transceivers which calculates a global position of each stationary transceiver based upon information contained within signals received from at least some satellites of the GNSS; and a communications processor which transmits a local global positioning signal from each of the stationary transceivers to the GNSS receiver in the area of poor reception, such local global positioning signals including at least the global position of the transmitting stationary transceiver.

19. The apparatus for providing position indicating signals as in claim 18 further comprising a multiplexer which multiplexes an identifier of each stationary transceiver into the local positioning signal.

20. The apparatus for providing position indicating signals as in claim 18 further comprising a phase comparator which synchronizes a local clock with a GNSS reference clock based upon a detected time of arrival of the signals received from the at least some satellites of the GNSS.

21. The apparatus for providing position indicating signals as in claim 20 further comprising an almanac buffer which receives almanac data from the at least some satellites of the plurality of satellites of the GNSS.

22. The apparatus for providing position indicating signals as in claim 21 further comprising an ephemeris buffer which receives ephemeris data from at least some satellites of the plurality of satellites of the GNSS.

23. The apparatus for providing position indicating signals as in claim 22 wherein the GNSS position processor which calculates a global position of each stationary transceiver based upon information from a plurality of satellites of the GNSS further comprises a trajectory processor which determines a position of each of the at least some satellites using the received ephemeris data and a set of Kepler equations.

24. The apparatus for providing a position indicating signal as in claim 23 wherein the GNSS position processor which calculates a global position of each stationary transceiver based upon information from a plurality of satellites of the GNSS further comprises propagation processor which determines a distance from each stationary transceiver and the at least some satellites based upon a measured time difference between the GNSS reference clock and signals arriving from each of the at least some satellites of the GNSS.

25. The apparatus for providing a position indicating signal as in claim 24 wherein the GNSS position processor which calculates a global position of each stationary transceiver based upon information from a plurality of satellites of the GNSS further comprises a triangulating processor which triangulates the position of each stationary transceiver based upon the position of each of the at least some satellites and the measured distance of the satellite from each of the stationary transceivers.

* * * * *